(12) United States Patent
Murabayashi et al.

(10) Patent No.: US 7,343,903 B2
(45) Date of Patent: Mar. 18, 2008

(54) FUEL TANK

(75) Inventors: Shinya Murabayashi, Saitama (JP);
Shoichiro Kumagai, Saitama (JP);
Koichiro Toyoda, Saitama (JP); Tohru Wako, Saitama (JP); Yoshinobu Terada, Saitama (JP); Yasunobu Endo, deceased, late of Saitama (JP); by Manami Endo, legal representative, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 11/392,227

(22) Filed: Mar. 29, 2006

(65) Prior Publication Data

US 2006/0219224 A1 Oct. 5, 2006

(30) Foreign Application Priority Data

Mar. 29, 2005 (JP) .................. P. 2005-095667

(51) Int. Cl.
*F02M 37/04* (2006.01)
*F02M 37/20* (2006.01)

(52) U.S. Cl. .................. 123/509; 123/516; 220/562

(58) Field of Classification Search ................ 123/516, 123/518, 519
See application file for complete search history.

(56) References Cited

U.S. PATENT DOCUMENTS

| | | | | |
|---|---|---|---|---|
| 3,949,720 A | * | 4/1976 | Zipprich et al. | ............ 123/518 |
| 5,056,493 A | * | 10/1991 | Holzer | ........................ 123/518 |
| 5,746,185 A | * | 5/1998 | Kidokoro et al. | ........... 123/516 |
| 5,868,120 A | * | 2/1999 | Van Wetten et al. | ........ 123/518 |
| 6,155,448 A | * | 12/2000 | Ishikawa et al. | ............ 220/562 |
| 6,176,118 B1 | * | 1/2001 | Kidokoro et al. | .............. 73/40 |
| 6,240,908 B1 | * | 6/2001 | Hyodo et al. | ................ 123/516 |
| 6,269,544 B1 | * | 8/2001 | Pahk et al. | ................... 33/502 |
| 6,446,614 B1 | * | 9/2002 | Matsuoka et al. | .......... 123/516 |
| 6,626,157 B2 | * | 9/2003 | Perry | ......................... 123/516 |

FOREIGN PATENT DOCUMENTS

JP 8197969 8/1996
JP 2001-310644 11/2001

* cited by examiner

*Primary Examiner*—Thomas Moulis
(74) *Attorney, Agent, or Firm*—Carrier, Blackman & Associates, P.C.; Joseph P. Carrier; William D. Blackman

(57) ABSTRACT

A fuel tank in which at least a part of a fuel storing unit is formed of a flexible film is provided with a main chamber having a variable volume by deforming according to a storing amount of a fuel, a sub-chamber having a volume which is kept substantially constant, and a fuel pump housed inside the sub-chamber. The main chamber and the sub-chamber are integrally formed to form the fuel storing unit.

14 Claims, 5 Drawing Sheets

FUEL TANK

The present invention claims foreign priority to Japanese patent application No. 2005-095667, filed on Mar. 29, 2005, the subject matter of which is incorporated herein by reference.

BACKGROUND OF THE INVENTION

1. Field of the Invention

The present invention relates to a fuel tank in which at least a part of a fuel storing unit is formed of a flexible film.

2. Description of the Related Art

Japanese Patent Unexamined Publication JP-A-2001-310644 discloses such a fuel tank having an elastic bladder film for storing fuel and a fuel pump apparatus including a liquid-level gauge. The bladder film and the fuel pump apparatus are arranged apart from each other inside the fuel tank. The fuel inside the bladder film is pumped up by the fuel pump apparatus and supplied to an engine.

Further, Japanese Unexamined Patent Publication No. JP-A-8-197969 discloses a fuel tank housing container having therein a fuel tank which is partially defined by an elastic film. Further, the fuel tank housing container has a separate chamber area located outside the fuel tank. The separate chamber area is provided with a fuel pump, the fuel pump supplying fuel inside the fuel tank to an engine.

However, in the fuel tank disclosed as above, since the fuel pump apparatus or the fuel pump is arranged outside the bladder film or the fuel tank defined by the elastic film, there is a problem that the structure is complicated and the number of components increases.

Therefore, arranging a fuel pump and a liquid-level gauge within a fuel storing unit formed at least partially of a flexible film to simplify the structure can be proposed. However, in this case, when the fuel storing unit expands or contracts according to an increase or a decrease of the storing amount of fuel, there is a possibility that the fuel storing unit and the fuel pump or the liquid-level gauge inside the fuel storing unit interfere with each other, thereby obstructing their functions.

SUMMARY OF THE INVENTION

In view of above, it is an object of the present invention to simplify the structure of a fuel tank in which at least a part of a fuel storing unit is formed of a flexible film, and to enable a reliable supply of fuel regardless of an increase or a decrease of the storing amount of the fuel.

However, the present invention need not achieve the above objects, and other objects not described herein may also be achieved. Further, the invention may achieve no disclosed objects without affecting the scope of the invention.

According to a first aspect of the invention, it is preferable that a fuel tank include a fuel storing unit, at least a part of which is formed of a flexible film. Further, it is preferable that the fuel storing unit include a main chamber having a variable volume by deforming according to a storing amount of a fuel, a sub-chamber having a volume which is kept substantially constant, and a fuel pump housed inside the sub-chamber. The main chamber and the sub-chamber are integrally formed to form the fuel storing unit. Further, the main chamber and the sub-chamber share a contiguous upper wall formed of an upper flexible film, and the main chamber and the sub-chamber also share a contiguous lower wall formed of a lower flexible film.

Therefore, the volume change of the main chamber absorbs the increase or decrease of the fuel storing amount, so that it is possible to prevent the influence of the variation of fuel storing amount from being exerted onto the volume of the sub-chamber. Therefore, it becomes difficult for the fuel pump housed inside the sub-chamber to receive the influence of the variation of fuel storing amount, so that the reliable supply of fuel is possible.

According to a second aspect of the invention, as set forth in the first aspect of the present invention, it is preferable that the fuel tank further include a deformation preventing member for suppressing a deformation of the sub-chamber.

Therefore, it is possible to prevent more surely the influence of the deformation of the main chamber from being exerted onto the sub-chamber.

According to a third aspect of the invention, as set forth in the first aspect of the present invention, it is preferable that the fuel tank further include a liquid-level gauge housed inside the sub-chamber.

Therefore, since the liquid-level gauge is housed in the sub-chamber which does not substantially change in its volume even in case that the fuel storing amount changes, liquid-level of the fuel which changes according to the fuel storing amount can be detected with good accuracy.

According to a fourth aspect of the invention, as set forth in the first aspect of the present invention, it is preferable that an upper surface of the main chamber be tilted so that a sub-chamber side thereof becomes higher, and a lower surface of the main chamber be tilted so that the sub-chamber side thereof becomes lower.

Therefore, since the upper surface of the main chamber is tilted so that the sub-chamber side thereof becomes higher, fuel steam staying at the upper portion of the main chamber can be moved to the sub-chamber side and to be exhausted. Further, since the lower surface of the main chamber is tilted so that the sub-chamber side thereof becomes lower, even when the residual amount of the fuel becomes small, the fuel can be supplied to the sub-chamber side to the end.

According to a fifth aspect of the invention, as set forth in the first aspect of the present invention, it is preferable that a filler tube for supplying a fuel into the fuel storing unit be communicated with the sub-chamber.

According to a sixth aspect of the invention, as set forth in the first aspect of the present invention, it is preferable that the fuel tank further include a housing provided in the sub-chamber, the fuel pump being housed inside the housing. The sub-chamber has an opening through which the housing can be inserted.

According to a seventh aspect of the invention, as set forth in the first aspect of the present invention, it is preferable that the fuel tank further include a support rubber disposed under a lower surface of the sub-chamber.

According to an eighth aspect of the invention, as set forth in the first aspect of the present invention, it is preferable that the flexible film include an ethylene-vinyl alcohol copolymer resin layer.

According to a ninth aspect of the invention, as set forth in the first aspect of the present invention, it is preferable that a depression portion be formed in a boundary area between the main chamber and the sub-chamber, and the deformation preventing member comes into contact with the depression portion.

DESCRIPTION OF THE PREFERRED EMBODIMENT

Figure 1:
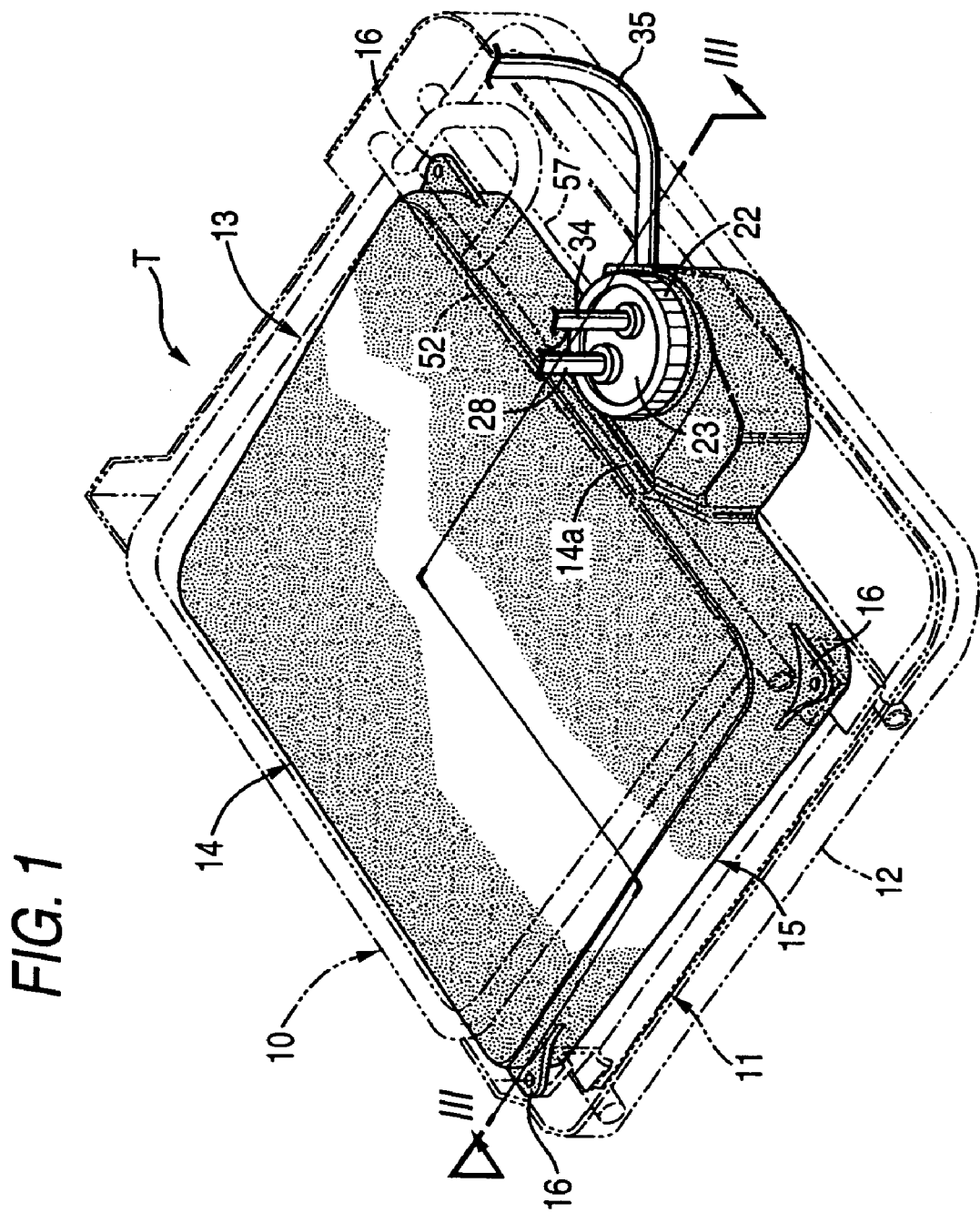
FIG. 1 is a perspective view of a fuel tank for a vehicle.
Figure 2:
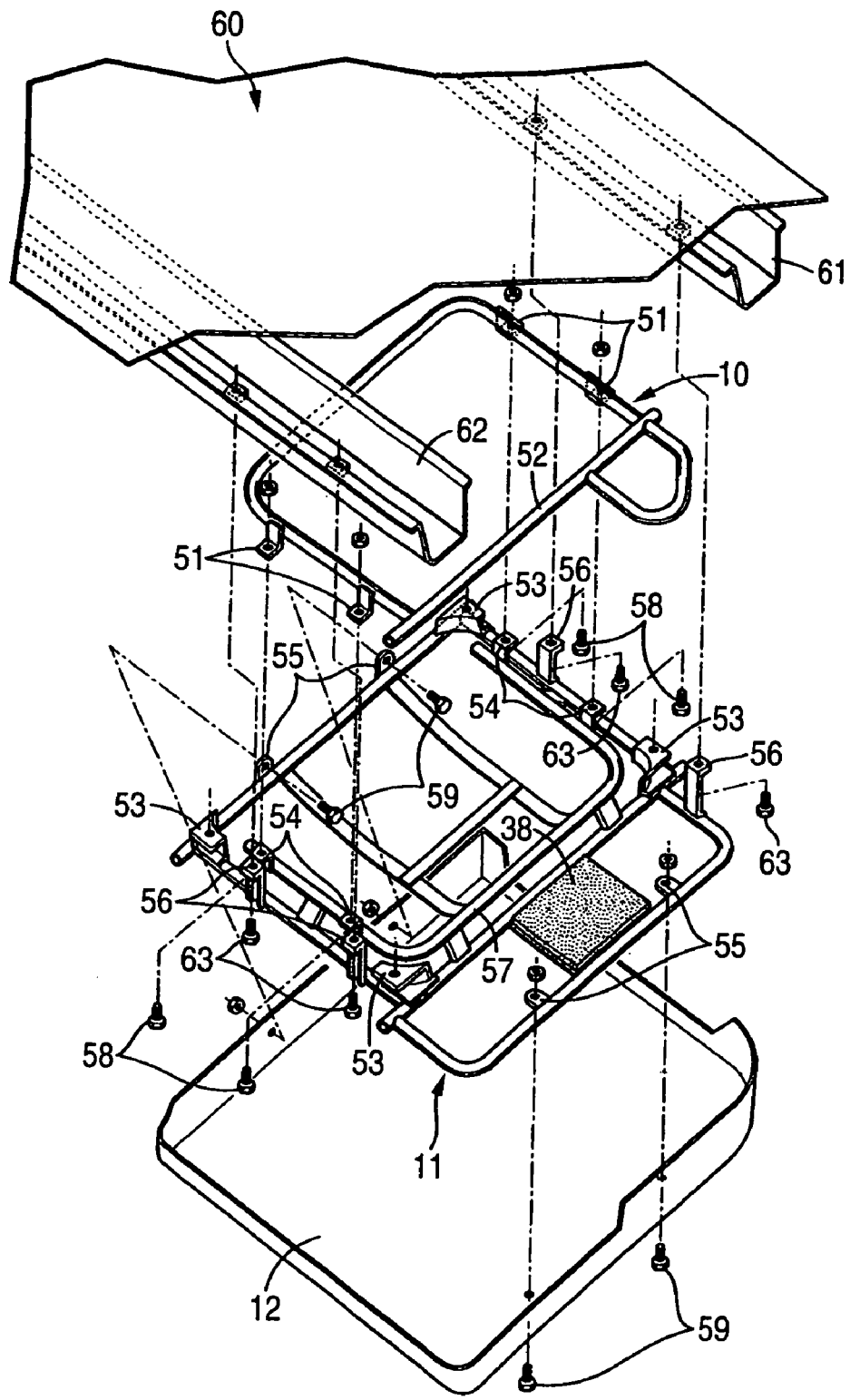
FIG. 2 is an exploded perspective view of a fuel tank support part.

A fuel tank according to an embodiment of the present invention will be described with reference to the drawings.

FIGS. 1 to 5 show the embodiment of the invention.

A variable volume tank 13 in the embodiment corresponds to the fuel storing unit of the invention, an upper flexible film 14 and a lower flexible film 15 in the embodiment correspond to the flexible film of the invention, and tank holding pipes 52 and 57 in the embodiment correspond to the deformation preventing member of the invention.

As shown in FIGS. 1 to 4, a fuel tank T for a vehicle includes an upper support frame 10 formed of a metal pipe, a lower support frame 11 formed of a metal pipe, and a protector 12 formed in the shape of a saucer by pressing a metal plate. Inside the fuel tank T, the variable volume tank 13 integrally formed of a flexible material is housed. The variable volume tank 13 includes the upper flexible film 14 and the lower flexible film 15, and is formed in the shape of a bladder by blow molding. The variable volume tank 13 forms therein a main chamber 17 and a sub-chamber 18 having a small volume relative to the main chamber, the sub-chamber protruding from the main chamber 17 so that the main chamber and the sub-chamber communicate with each other.

The upper support frame 10 has four attachment brackets therearound, and a tank holding pipe 52 formed linearly. The lower support frame 11 includes four tank support parts 53, four first attachment brackets 54, four second brackets 55, four third brackets 56, a U-shaped tank holding pipe 57, and a support rubber 38.

The four attachment brackets 51 of the upper support frame 10 and the four first attachment brackets 54 of the lower support frame 11 are fastened by bolts 58, the four second attachment brackets 5 of the lower support frame 11 and the protector 12 are fastened by bolts 59, and the four third attachment brackets 56 of the lower support frame 11 and two cross members 61, 62 along a floor panel 60 are fastened by bolts 63.

In a boundary area between the main chamber 17 and the sub-chamber 18, depression portions 14a and 15a are formed, each being depressed in the shape of a groove so as to come close to each other. Further, when the variable volume tank 13 is in a free state, the upper flexible film 14 of the main chamber 17 is tilted so as to become high gradually toward the sub-chamber 18 side, and the lower flexible film 15 of the main chamber 17 is tilted so as to become low gradually toward the sub-chamber 18 side. Flanges 16 located at four corners of the variable volume tank 13 are fastened to four tank support parts 53 of the lower support frame 11 by four bolts 18 and nuts 20, whereby the variable volume tank 13 is supported inside the upper support frame 10 and the lower support frame 11.

In the upper flexible film 14 of the sub-chamber 18 of the variable volume tank 13, a circular opening 14b is formed. To a female thread 14c formed around the opening 14b, a cap 22 is screwed through a seal member 21. At this time, between the upper surface of the opening 14b and the lower surface of the cap 22, a disc-shaped lid plate 23 is put and fixed through the seal member 21, and a fuel pump module 24 is previously fixed onto the lower surface of the lid plate 23. The fuel pump module 24 includes a housing 25 that has an opening at its part, a fuel pump 27 supported through a stay 26 inside the housing 25, a feed pipe 28 extending from the fuel pump 27 through the lid plate 23 to the outside, a relief valve 29 provided midway of the feed pipe 28, a return pipe 30 for exhausting the excess fuel from the relief valve 29 into the housing 24, a liquid-level gauge 31 fixed inside the housing 25, and a float 32 which operates the liquid-level gauge 31 in accordance with the height of fuel liquid-level. Further, a cut valve 33 that closes when the height of fuel liquid-level reaches the upper limit value is provided on the upper surface of the housing 25. A steam exhausting pipe 34 extending from the cut valve 33 is connected to the vicinity of an oil supply port 36 located at the upper end of a filler tube 35 communicating with the sub-chamber 18 of the variable volume tank 13. The steam exhausting pipe 34 branches at its intermediate portion, and the branching portion is connected to a not-shown canister.

The housing 25 has a size that can be inserted or pulled out through the opening 14b in the upper flexible film 14 of the sub-chamber 18 of the variable volume tank 13. Therefore, when the cap 22 is taken off, the fuel pump module 24 formed integrally with the lid plate 23 can be pulled out through the opening 14b of the sub-chamber 18 of the variable volume tank 13. Accordingly, the maintenance of the fuel pump module 24 improves greatly.

When the internal pressure is applied to the variable volume tank 13, the distance between the upper flexible film 14 and the lower flexible film 15 of the tank 13 widens and the shape of the sub-chamber 18 changes. In order to prevent this change of the sub-chamber 18, the tank holding pipe 52 of the upper support frame 10 comes into contact with the depression portion 14a of the upper flexible film 14, and the tank holding pipe 57 of the lower support frame 11 comes into contact with the depression portion 15a of the lower flexible film 15. In this state, the lower surface of the lower flexible film 15 of the sub-chamber 18 is supported through the support rubber 38 by the inner surface of the lower protector 12.

Figure 5:
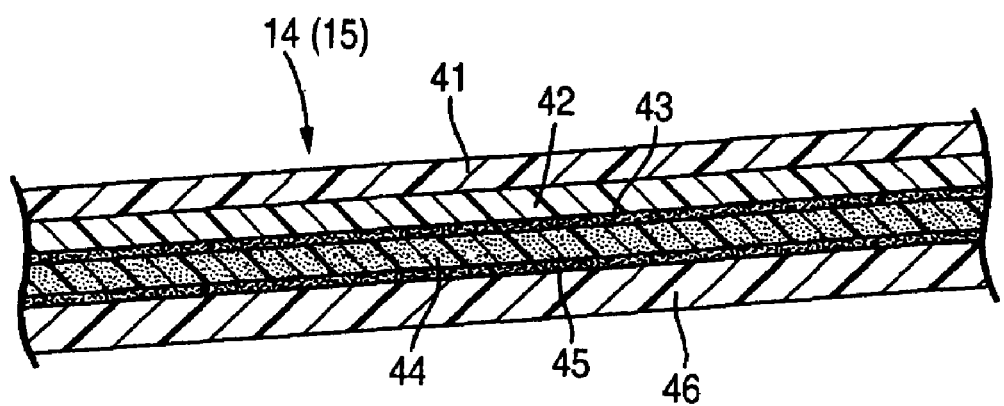
FIG. 5 is an enlarged view of a portion V in FIG. 3.

As shown in FIG. 5, the upper flexible film 14 (and also the lower flexible film 15) has six layers of a polyethylene resin layer 41, a reproduction layer 42, an adhesive layer 43, an ethylene-vinyl alcohol copolymer resin layer 44, an adhesive layer 45 and a polyethylene layer 46 in this order from the outside. The ethylene-vinyl alcohol copolymer resin layer 44 suppresses the transmission amount of fuel stream to the minimum.

The working of the embodiment of the invention including the above components will be described.

Figure 3:
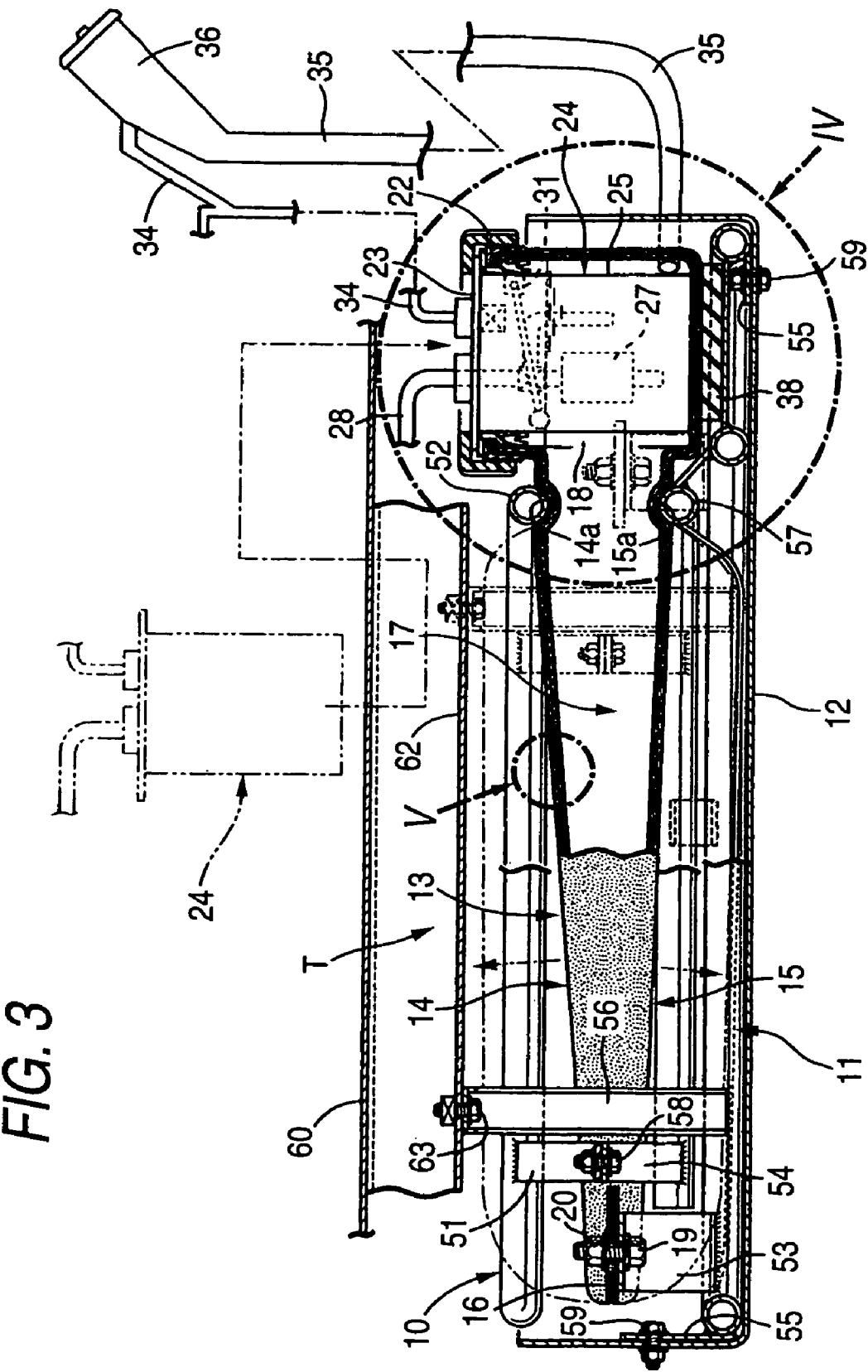
FIG. 3 is a sectional view taken along a line III-III in FIG. 1.
Figure 4:
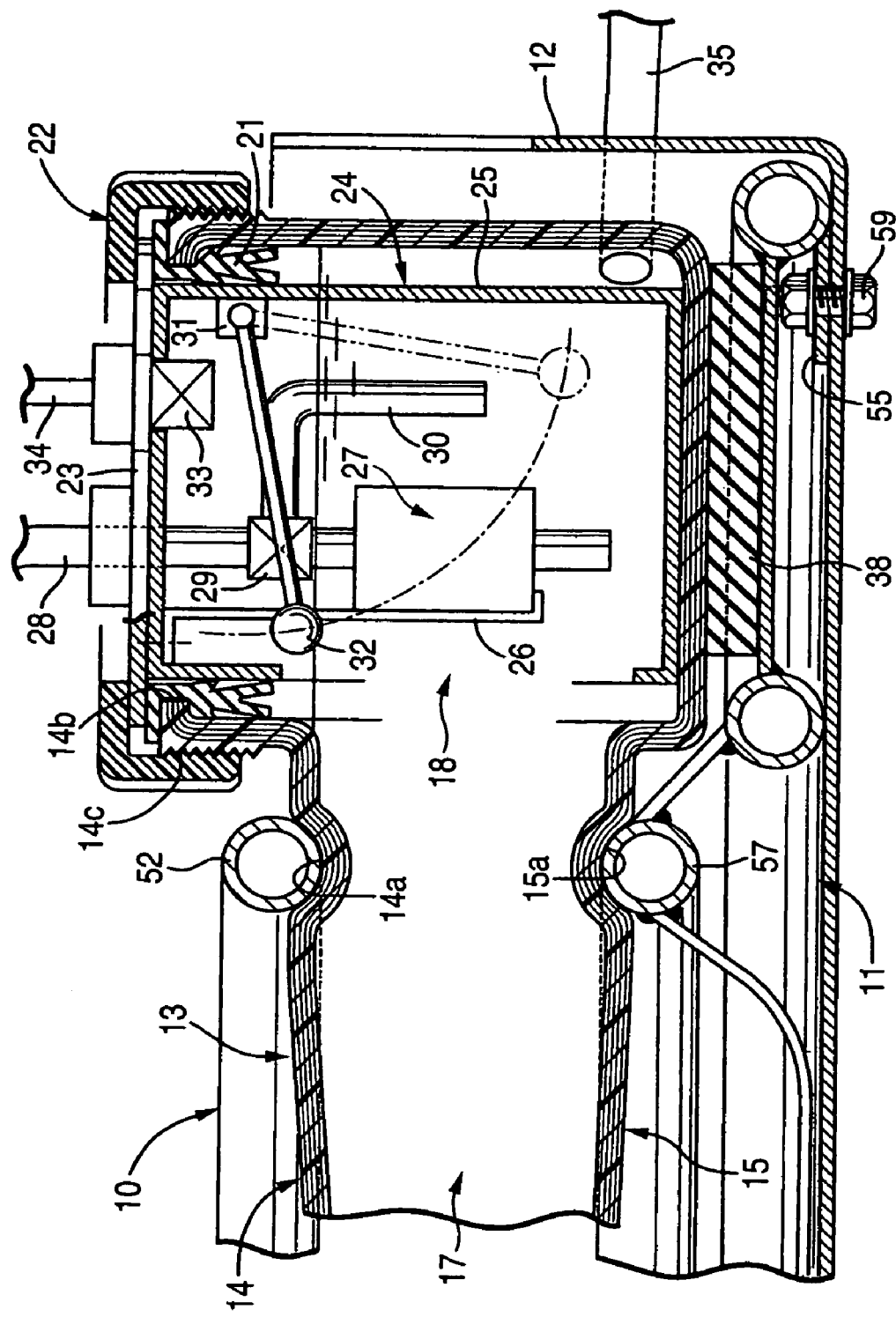
FIG. 4 is an enlarged view of a portion IV in FIG. 3.

When the residual amount of fuel stored in the variable volume tank 13 of the fuel tank T is small, as shown in FIG. 3, the upper flexible film 14 of the main chamber 17 of the variable volume tank 13 and the lower flexible film 15 thereof contract, and the upper flexible film 14 and the lower flexible film 15 separate greatly from the inner surfaces of the floor panel 60 and the protector 12. When the fuel is supplied through the filler tube 35 to the variable volume tank 13 under this state, the upper flexible film 14 and the lower flexible film 15 of the main chamber 17 expand as shown in chain lines, so that the fuel tank T is full of the fuel.

Even in case that the main chamber 17 of the variable volume tank 13 thus expands or contracts, since the depression portions 14a and 15a of the upper flexible film 14 and the lower flexible film 15 are restricted by the tank holding pipes 52 and 57, the volume of the sub-chamber 18 hardly changes. Therefore, the fuel pump module 24 housed inside the sub-chamber 18 does not interfere with the upper flexible film 14 and the lower flexible film 15, so that there is no fear that the functions of the fuel pump 27, the liquid-level gauge 31, and the cut valve 33 are obstructed.

Further, since the upper flexible film 14 of the main chamber 17 is tilted so as to become higher toward the sub-chamber 18 side thereof, the fuel steam staying at the upper portion of the main chamber 17 can be moved to the sub-chamber 18 side thereby to be surely exhausted from the steam exhausting pipe 34. Further, since the lower flexible film 15 of the main chamber 17 is tilted so as to become lower toward the sub-chamber 18 side thereof, even when the residual amount of the fuel becomes small, the fuel can be supplied to the sub-chamber 18 side to the end, and can be pumped by the fuel pump 27. Further, the fuel steam does not stay in the main chamber 17 that can expand and contract, while a small amount of the fuel steam stays in the upper portion of the sub-chamber 18 having a volume that is kept substantially constant. Therefore, even in case that the volume of the canister is reduced, it is possible to inhibit the fuel steam from radiating to the air to the minimum.

Furthermore, the main chamber 17 for storing the fuel and the sub-chamber 18 for housing the fuel pump module 24 are formed integrally as the variable volume tank 13 which is common to the chambers 17 and 18. Therefore, compared with the case where the sub-tank corresponding to the sub-chamber 18 is formed of another member, the present invention contributes to reduction of the number of parts and reduction of the number of assembly steps.

Though the embodiment of the invention has been described above, various changes in design may be made without departing from the spirit of the invention.

For example, though the fuel tank T is illustrated as a fuel tank for a vehicle in the embodiment, the fuel tank T of the invention can be applied to other arbitrary application.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A fuel tank comprising:
a fuel storing unit including:
a main chamber having a variable volume by deforming according to a storing amount of a fuel;
a sub-chamber having a volume which is kept substantially constant;
a fuel pump housed inside the sub-chamber,
wherein the main chamber and the sub-chamber are integrally formed to form the fuel storing unit,
the main chamber and the sub-chamber share a contiguous upper wall formed of an upper flexible film, and
the main chamber and the sub-chamber share a contiguous lower wall formed of a lower flexible film.

2. The fuel tank according to claim 1, further comprising:
a deformation preventing member for suppressing a deformation of the sub-chamber.

3. The fuel tank according to claim 1, further comprising:
a liquid-level gauge housed inside the sub-chamber.

4. The fuel tank according to claim 1, wherein an upper surface of the main chamber is tilted so that a sub-chamber side thereof becomes higher, and
a lower surface of the main chamber is tilted so that the sub-chamber side thereof becomes lower.

5. The fuel tank according to claim 1, wherein a filler tube for supplying a fuel into the fuel storing unit is communicated with the sub-chamber.

6. The fuel tank according to claim 1, further comprising:
a housing provided in the sub-chamber, the fuel pump being housed inside the housing,
wherein the sub-chamber has an opening through which the housing can be inserted.

7. The fuel tank according to claim 1, further comprising:
a support rubber disposed under a lower surface of the sub-chamber.

8. The fuel tank according to claim 1, wherein each of the upper and lower flexible films includes an ethylene-vinyl alcohol copolymer resin layer.

9. The fuel tank according to claim 2, wherein a depression portion is formed in a boundary area between the main chamber and the sub-chamber, and the deformation preventing member comes into contact with the depression portion.

10. The fuel tank according to claim 1, wherein the volume of the main chamber varies in accordance with deformation of the upper and lower flexible films.

11. The fuel tank according to claim 1, wherein the upper wall and the lower wall face with each other.

12. The fuel tank according to claim 6, further comprising:
a cap; and
a lid plate having a lower surface to which the housing is attached,
wherein the cap fixes the lid plate at an opening of the sub-chamber.

13. A fuel tank comprising:
a fuel storing unit, at least a part of which is formed of a flexible film, including:
a main chamber having a variable volume by deforming according to a storing amount of a fuel;
a sub-chamber having a volume which is kept substantially constant; and
a fuel pump housed inside the sub-chamber,
wherein the main chamber and the sub-chamber are integrally formed to form the fuel storing unit,
an upper surface of the main chamber is tilted so that a sub-chamber side thereof becomes higher, and
a lower surface of the main chamber is tilted so that the sub-chamber side thereof becomes lower.

14. A fuel tank comprising:
a fuel storing unit, at least a part of which is formed of a flexible film, including:
a main chamber having a variable volume by deforming according to a storing amount of a fuel;
a sub-chamber having a volume which is kept substantially constant; and
a fuel pump housed inside the sub-chamber,
a deformation preventing member for suppressing a deformation of the sub-chamber,
wherein the main chamber and the sub-chamber are integrally formed to form the fuel storing unit,
a depression portion is formed in a boundary area between the main chamber and the sub-chamber, and
the deformation preventing member comes into contact with the depression portion.

* * * * *